No. 648,635. Patented May 1, 1900.
F. A. SEIBERLING.
VEHICLE TIRE.
(Application filed Jan. 11, 1900.)
(No Model.)
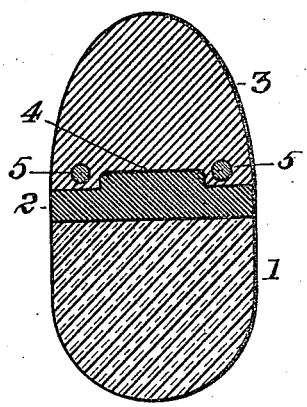
Witnesses:
Inventor:
Frank A. Seiberling,
by Humphrey & Humphrey,
Attorneys.

United States Patent Office.

FRANK A. SEIBERLING, OF AKRON, OHIO.

VEHICLE-TIRE.

SPECIFICATION forming part of Letters Patent No. 648,635, dated May 1, 1900.

Application filed January 11, 1900. Serial No. 1,075. (No model.)

*To all whom it may concern:*

Be it known that I, FRANK A. SEIBERLING, a citizen of the United States, residing at Akron, in the county of Summit and State of Ohio, have invented a certain new and useful Improvement in Vehicle-Tires, of which the following is a specification.

My invention has relation to improvements in that class of vehicle-tires that embody a metallic tire surrounding the wheel-felly and a vulcanized-rubber tire resting and confined on the metallic tire and constituting the tread portion of the wheel. Heretofore in the construction of these tires it has been customary to construct the metallic tire with a channel in its periphery, usually with slightly outwardly sloping sides, and the rubber portion conformed to fit and rest in this channel and project above the sides with its periphery rounded or curved, the rubber portion being reinforced by longitudinal wires above the sides of the channel-tire. Objection has been found to this construction in the fact that grit will work into the channeled tire and by the slight movement due to the expansion and contraction of the rubber wear away the latter and eventually render the joint loose between the metal and rubber, and a further objection is found in the unsightly appearance of the metal flanges outside of the rubber, and a final objection is found in the fact that when the iron tire has lateral flanges in crossing either street or steam car tracks the lateral flanges encountering the track at an angle less than a right angle, the two iron surfaces meeting, the wheel tends to slide or "slue around," to the strain of the vehicle and discomfort and danger of the passengers. The object of my invention is to avoid these objections and to produce a tire in which the metal and rubber parts shall be securely connected and retained without danger of lateral displacement.

To the aforesaid object my invention consists in the peculiar and novel construction, arrangement, and combination of parts hereinafter described, and then specifically pointed out in the claims, reference being had to the accompanying drawing, forming a part of this specification.

In the drawing, which represents a section of a wheel-felly provided with my improved tire, 1 is the felly, 2 the metal tire, and 3 the rubber tire. The metal tire 2 has in its center a wide longitudinal ridge 4 in form of a parallelogram with corners slightly rounded and integral with the tire. The rubber portion of vulcanized rubber 3 has in its inner face a corresponding groove adapted to snugly fit the ridges 4 and at each side adjacent to the sides of the ridge 4 and preferably about equidistant from the edges of said ridge and the main outer surface of the metal tire two openings extending longitudinally through the tire, in which are passed wires 5 5, with their ends meeting and secured in tension by any of the approved methods.

I have shown as a preferable construction the ridge 4 in form of a low right-angled parallelogram; but this may be higher, narrower, or with sloping or curved sides without departing from my invention, and the wires may be placed farther in the rubber to secure greater retaining-stock. The bottom of the rubber may be covered with duck in the usual manner to further prevent wear; but as this is optional and a common device it has not been deemed necessary to show it in the drawing.

I claim as my invention—

1. An improved vehicle-tire consisting of a flat metallic band of the width of the wheel-felly, with a longitudinal ridge in its outer face, a rubber tire having a base of like width when in use, with a groove to fit said ridge, and longitudinal wires on each side of said groove, substantially as shown and described.

2. An improved vehicle-tire consisting of a flat metallic band of the width of the wheel-felly, with a longitudinal ridge in its outer face, a rubber tire having a base of like width when in use, with a groove to fit said ridge, and longitudinal wires above and at the sides of said groove, substantially as shown and described.

3. An improved rubber tire having a rounded tread portion, a flat inner periphery with a longitudinal channel to engage and fit a ridge upon a metallic tire, of like width as the base of said rubber tire when in use, and longitudinal wire-holes above and at the sides of said channel, substantially as shown and described.

In testimony that I claim the above I hereunto set my hand in the presence of two subscribing witnesses.

FRANK A. SEIBERLING.

In presence of—
JESSIE RUTHERFORD,
C. P. HUMPHREY.